United States Patent
Harvey et al.

(10) Patent No.: US 7,181,490 B1
(45) Date of Patent: Feb. 20, 2007

(54) METHOD AND APPARATUS FOR MAPPING NETWORK EVENTS TO NAMES OF NETWORK DEVICES

(75) Inventors: Andrew G. Harvey, Pleasanton, CA (US); Leo Pereira, Fremont, CA (US); Hsuan-Chung Lee, Cupertino, CA (US); Sudha Sundaresan, San Jose, CA (US); Mukunda Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 756 days.

(21) Appl. No.: 09/783,770

(22) Filed: Feb. 14, 2001

(51) Int. Cl.
*G06F 15/16* (2006.01)

(52) U.S. Cl. ..................... 709/203; 719/318
(58) Field of Classification Search ............... 370/392; 713/201; 707/10; 709/238
See application file for complete search history.

(56) References Cited

U.S. PATENT DOCUMENTS

| | | | | |
|---|---|---|---|---|
| 5,621,892 A | * | 4/1997 | Cook | 709/224 |
| 5,873,084 A | * | 2/1999 | Bracho et al. | 707/10 |
| 5,950,188 A | * | 9/1999 | Wildermuth | 707/3 |
| 5,959,989 A | * | 9/1999 | Gleeson et al. | 370/390 |
| 6,064,656 A | * | 5/2000 | Angal et al. | 370/254 |
| 6,314,533 B1 | * | 11/2001 | Novik et al. | 714/39 |
| 6,404,237 B1 | * | 6/2002 | Mathew et al. | 326/113 |
| 6,477,585 B1 | * | 11/2002 | Cohen et al. | 719/318 |
| 6,694,450 B1 | * | 2/2004 | Kidder et al. | 714/15 |
| 6,710,702 B1 | * | 3/2004 | Averbuch et al. | 340/7.1 |
| 6,804,237 B1 | * | 10/2004 | Luo et al. | 370/392 |

(Continued)

FOREIGN PATENT DOCUMENTS

EP 0375664 * 1/1984

(Continued)

OTHER PUBLICATIONS

"Sun plans new offensive", InfoWorld, Framingham: May 17, 1999. vol. 21, Iss. 20.*

(Continued)

*Primary Examiner*—Bunjob Jaroenchonwanit
*Assistant Examiner*—Angela Widhalm
(74) *Attorney, Agent, or Firm*—Hickman Palermo Truong & Becker LLP

(57) ABSTRACT

A method of automatically subscribing a network device to a plurality of events applicable to a logical group, of which the network device is a member, is disclosed. The method involves first creating and storing a mapping that associates a plurality of network devices with a logical group and that associates the logical group with one or more events that can pass over an event bus to which the network device is logically coupled. At runtime, a device identifier of one of the network devices in the logical group is received, an event identifier of an event that is among the one or more events that are in the second mapping is received. Based on the mapping, the method causes the network device to receive all events that are associated in the mapping with the logical group that includes the network device. As a result, a network device receives all events that pertain to it without having to store a list of the logical groups in which it participates and without having to know what events pertain to it or the groups.

11 Claims, 9 Drawing Sheets

U.S. PATENT DOCUMENTS

| | | | |
|---|---|---|---|
| 6,910,070 B1* | 6/2005 | Mishra et al. | 709/224 |
| 7,010,586 B1* | 3/2006 | Allavarpu et al. | 709/223 |
| 7,085,814 B1* | 8/2006 | Gandhi et al. | 709/208 |
| 2002/0019886 A1* | 2/2002 | Sanghvi et al. | 709/318 |
| 2002/0087594 A1* | 7/2002 | Peters | 707/511 |
| 2002/0087878 A1* | 7/2002 | Ballen et al. | 713/201 |
| 2002/0103818 A1* | 8/2002 | Amberden | 707/205 |

FOREIGN PATENT DOCUMENTS

| | | | |
|---|---|---|---|
| JP | 2000-003334 | * | 7/2000 |
| JP | 2000-207362 | * | 7/2000 |
| WO | WO 95/14266 | * | 5/1995 |

OTHER PUBLICATIONS

"Publish and subscribe meets the Internet", Loshin, P. Feb. 1998.*
"TIBCO software deliver wireless information services in Ericsson Solutions", Jul. 1999, Ericsson Press Release.*
"Tibco release tool for business process re-automation", Eugene Grygo, Mar. 2000.*
"Architecture of the READY Event Notification Service", Gruber et al., 1999.*
"Publish and subscribe meets the Internet," Loshin, P., Byte (International Edition), vol. 23, No. 2, p. 125-8.*
"Tibco release toll for business process re-automation," Eugene Grygo, Mar. 2000.*
"Architecture of the READY Event Notification Service," Gruber et al., 1999.*

* cited by examiner

METHOD AND APPARATUS FOR MAPPING NETWORK EVENTS TO NAMES OF NETWORK DEVICES

FIELD OF INVENTION

The present invention generally relates to computer networks. The invention relates more specifically to a method and apparatus for mapping network events to names of network devices.

BACKGROUND OF THE INVENTION

In many distributed computer systems the interaction between hardware or software components is asynchronous. In the Publish/Subscribe communications paradigm components send and receive data using subject name or topic addressing. For example, in the simplest form of a distributed system, a client element that wishes to receive data on a particular subject will subscribe to the event on which a server is publishing data about that subject. If the client wishes to receive information about a different subject, the client subscribes to a different event that relates to that subject. A client may have varying application needs that warrant changing the events to which it is subscribed. One prior system that supports such operation is The Information Bus (TIB/RENDEZVOUS) software, which is event bus software from TIBCO Software, Inc.

A network is an example of a distributed system in which such event subscription is used. In a large network that comprises many devices such as routers, switches, and gateways, making a software or configuration change to a single device is simple. However, making the same change to a group of devices can become cumbersome and will not scale to a large number of devices. However, large enterprises and users of large networks want to have the ability to configure groups of devices with as little intervention as possible. Such users typically use various provisioning applications to configure different services for the groups of devices. Unfortunately, a problem with this approach is that each application has its own logical view of the devices in the network that need configuration, which impedes the process of re-configuring large numbers of devices.

FIG. 1A is a simplified block diagram of a network 2 that includes a plurality of routers A1, A2, B1, B2, C1, C2. Assume, for purposes of illustrating an example, that routers A1, A2 are at campus A, routers B1, B2 are at campus B, and routers C1, C2 are at campus C of the enterprise that owns or operates the campuses and the network. A voice-over-IP application, Service X, is configured only on routers A1, A2, as indicated by oval 4. Service Z, which provides quality of service treatment of network data flows, is configured only on router B1, as indicated by oval 6. Service Y, which provides a virtual private network (VPN), involves routers B2, C1, as indicated by oval 8. Thus, each of Service X, Y, and Z are concerned only with the devices in ovals 4, 6, 8 respectively; in addition, each Service tends to treat the devices within its respective oval as a group rather than as individual devices.

It would be highly desirable to enable group level administration by provisioning applications, using a component that knows how to map events to a single device or group of devices.

It would also be desirable to provide such a component that can allow enterprises or other network users to name these events according to their service or business needs.

There is also a need for such a mapping component that fits well into a distributed system and that leverages the benefits of subject name addressing and provisioning.

In particular, there is a need to enable administrators and enterprises to group routers into sensible group(s) or namespace(s). Since namespace(s) can't be determined a priori, there is a need for a way to map namespaces based on their needs. Further, it is difficult to change device software, and there is a need for a faster way to affect namespace changes. There is also a need for a way to allow user applications to have different views of the application space.

SUMMARY OF THE INVENTION

The foregoing needs, and other needs and objects that will become apparent for the following description, are achieved in the present invention, which comprises, in one aspect, a method of automatically subscribing a network device to a plurality of events applicable to a logical group of which the network device is a member. Broadly characterized, the invention provides a generalized mechanism for mapping a first name space to a second name space, wherein the name spaces are heterogeneous.

The method involves first creating and storing a mapping that associates a plurality of network devices with a logical group and that associates the logical group with one or more events that can pass over an event bus to which the network device is logically coupled. At runtime, when a device belonging to a logical group sends an event identifier, along with its device identifier, the event is mapped to one or more events. Based on the mapping, the method causes the network device to receive all events that are associated in the mapping with the logical group that includes the network device.

As a result, a network device receives all events that pertain to it without having to store a list of the logical groups in which it participates and without having to know what events pertain to it or the groups.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for mapping network events to names of network devices is described. Broadly characterized, the invention provides a generalized mechanism for mapping a first name space to a second name space, wherein the name spaces are heterogeneous. For example, the mechanisms described herein can be used to implement a name mapping service analogous to the Domain Name Service (DNS) now in use for resolving domain names into Internet Protocol (IP) addresses in the Internet. Using the disclosed mechanisms, domain names can be resolved into one or more target addresses, including IP addresses, Apple-Talk addresses, CORBA Interoperable Object References (IOR), etc. Thus, embodiments can provide a more flexible and improved substitute for DNS.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context and Functional Overview

Figure 1A:
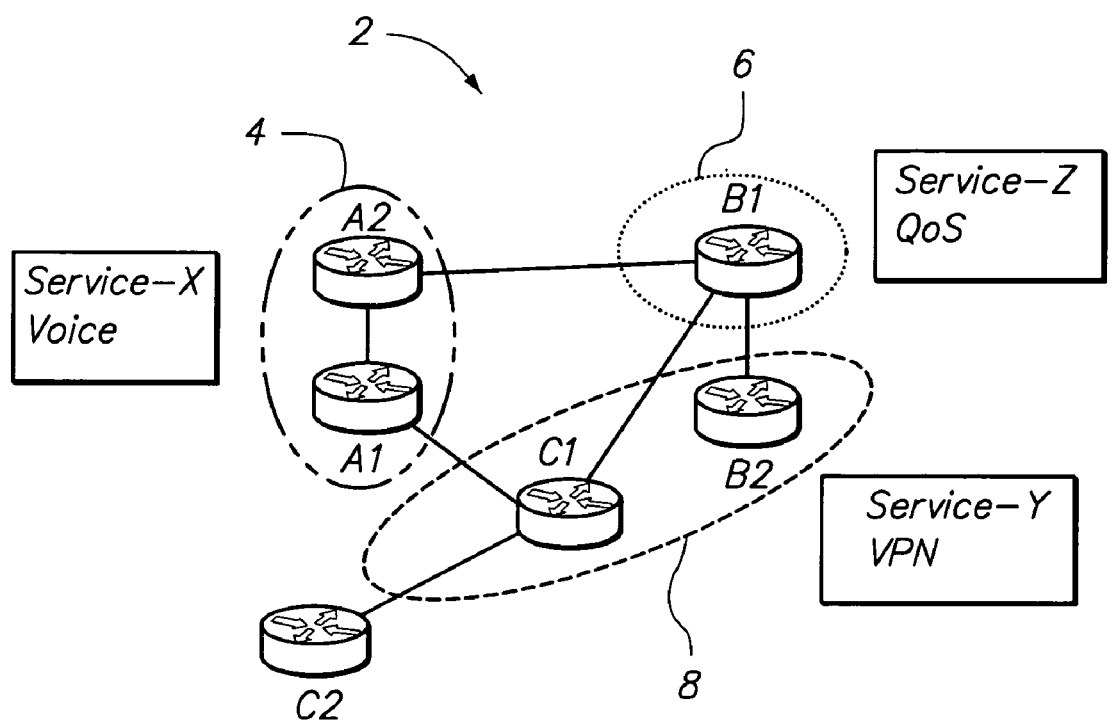
FIG. 1A is a simplified block diagram of a network.
Figure 1B:
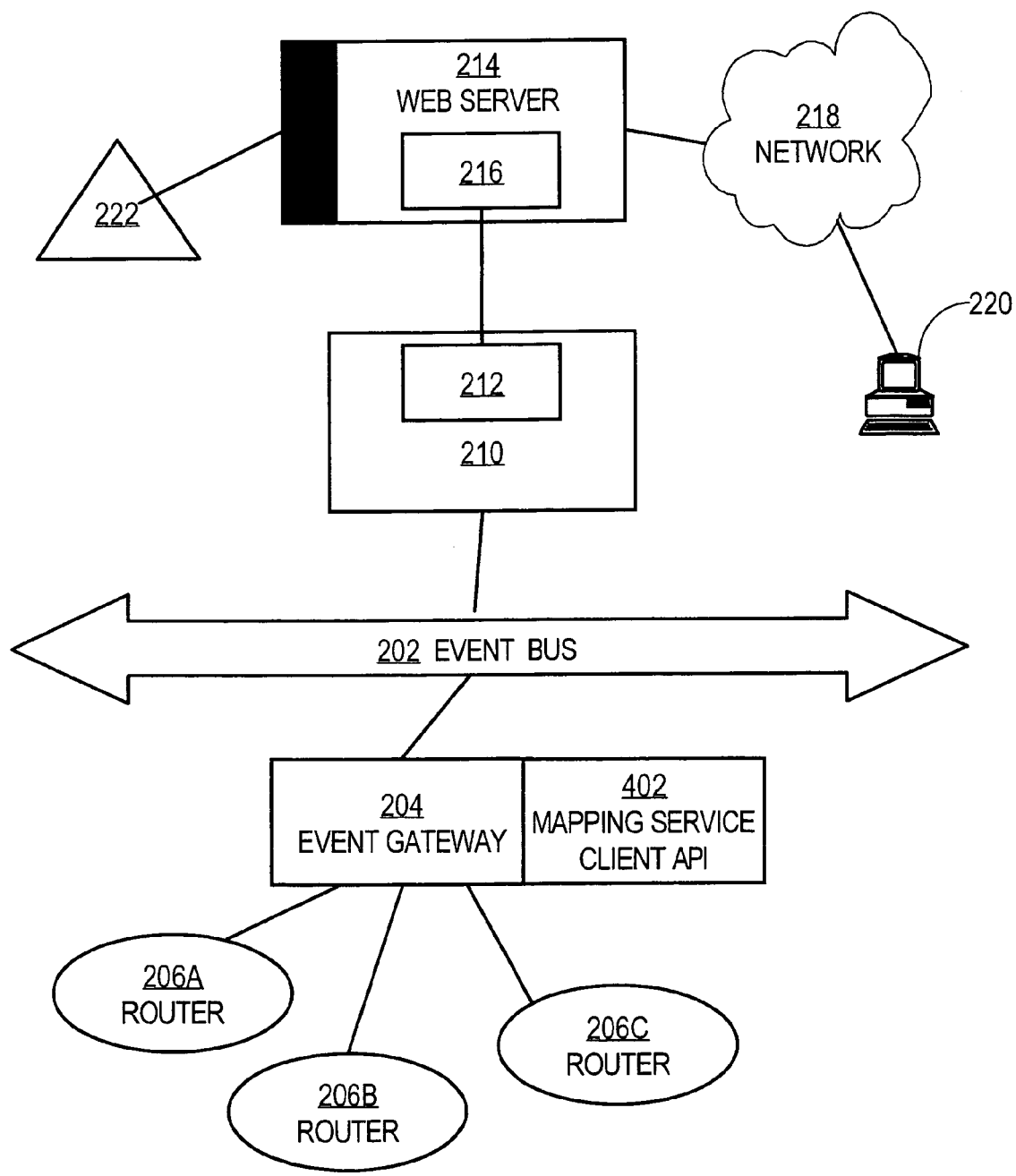
FIG. 1B is a block diagram of an example embodiment of a namespace mapping service and a network context in which it may operate.

FIG. 1B is a block diagram of an example embodiment of a namespace mapping service and a network context in which it may operate. An Event Bus 202 is communicatively coupled to an Event Gateway 204, which is coupled to one or more network devices 206A, 206B, 206C. In one embodiment, Event Bus 202 is the TIB/Rendezvous software product available from TIBCO Software, Inc. In other embodiments, transport mechanisms other than event systems are used, such as CORBA, HTTP, etc. The mechanism described in this document is general in nature; thus, an event bus system is not required.

A Namespace Mapping Service 210 can also be coupled to Event Bus 202 and can communicate through Event Bus 202 with Event Gateway 204. The publisher elements may Event Gateway 204 provides an interface from Event Bus 202 to network devices 206A, 206B, 206C. To receive information that is published by the publisher elements regarding events of interest, network devices 206A, 206B, 206C subscribe at Event Gateway 204 to one or more events. A Namespace Mapper Client API 402 is associated with Event Gateway 204 and facilitates subscription to events by such devices.

Figure 2:
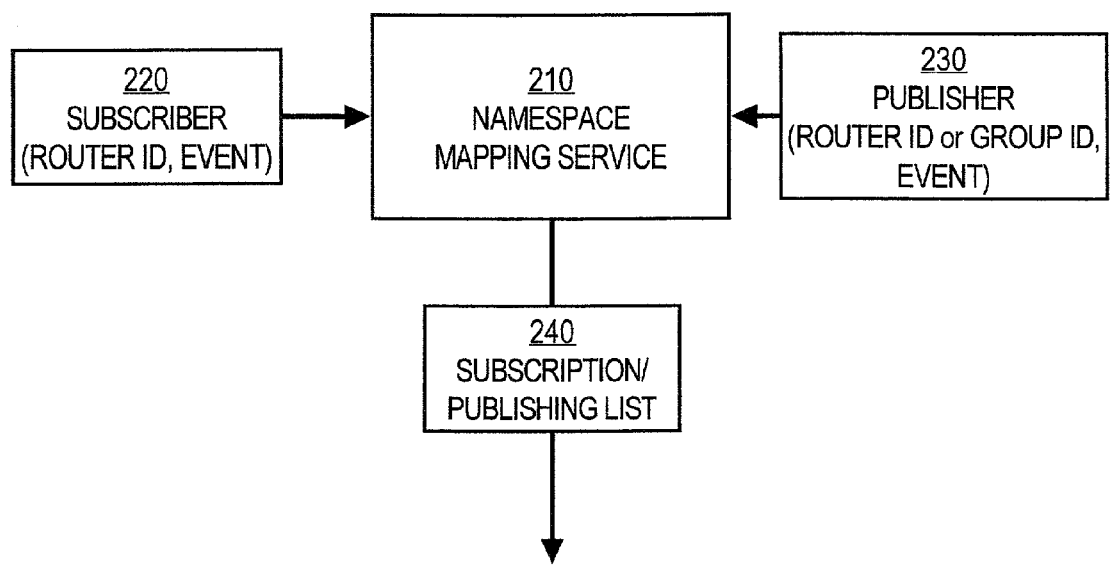
FIG. 2 is a block diagram providing a functional overview of the namespace mapping service of FIG. 1B.

FIG. 2 is a block diagram providing a functional overview of the namespace mapping service of FIG. 1B.

One or more subscribers 220 contact Namespace Mapping Service 210 and provide parameter values such as a router identifier ("router id") and event identifier. In response, Namespace Mapping Service 210 returns a list 240 of one or more events to which the subscriber 220 should subscribe. List 240 is delivered to Event Gateway 240, directly or through Event Bus 202. As a result, using a single subscription request, subscribers 220 automatically become subscribed to all events that affect them or that are related to a device group to which the subscribers belong. Importantly, the subscribers do not need to provide specific event identifiers for all events that are pertinent to the subscribers. Namespace Mapping Service 210 automatically determines, based on the identity of the subscriber, all events that pertain to the subscriber 220. Similarly, when a publisher provides the identifier of a target, the Namespace Mapping Service 210 returns a list of subjects that pertain to that publisher 230.

Figure 3:
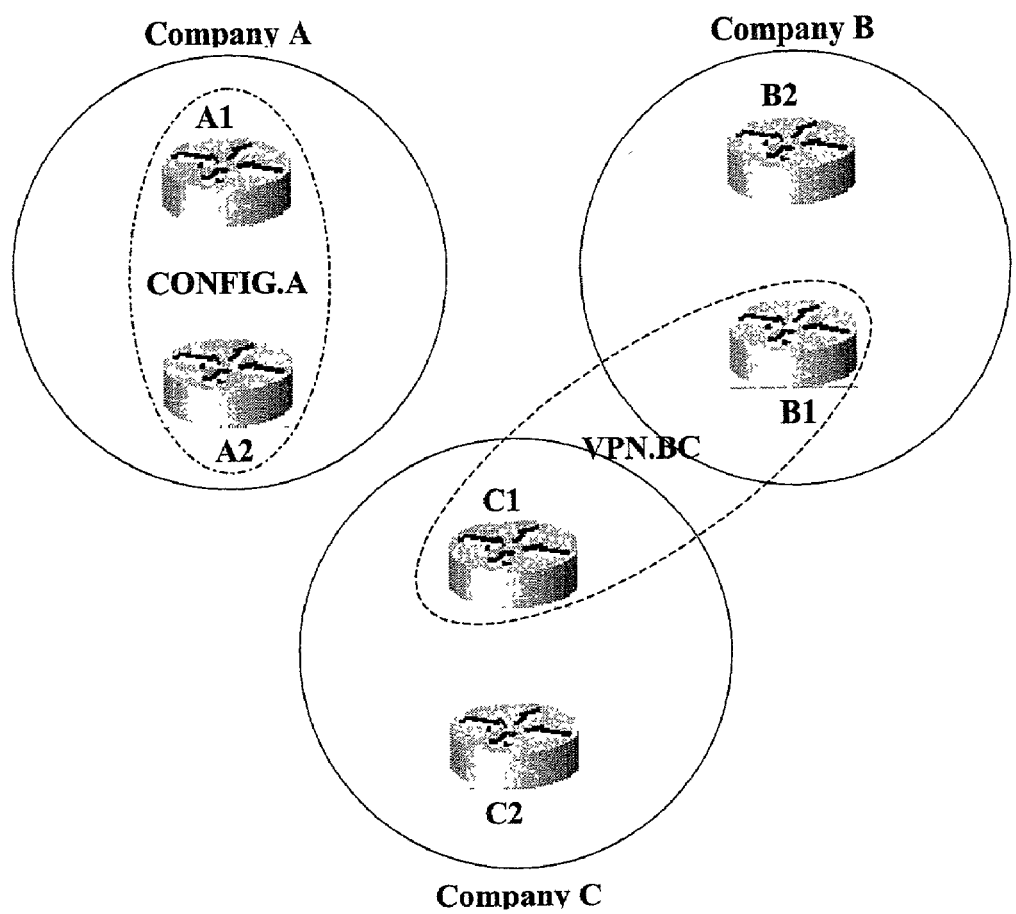
FIG. 3 is a block diagram illustrating a plurality of enterprises that participate in virtual private networks.

FIG. 3 is a block diagram illustrating a plurality of enterprises that participate in virtual private networks, for the purpose of illustrating an example of use of the elements of FIG. 1B, FIG. 2. Company A owns router devices A1, A2. Company B owns routers B1, B2. Company C owns routers C1, C2. Router A1 and router A2 participate in the CONFIG.A group. Routers B1, C1 are part of the VPN.BC group. Routers B2, C2 are standalone routers. To manage the devices in this configuration, Namespace Mapping Service 210 queries a mapping lookup table that contains values identifying the events to which each device publishes and subscribes. For example, for the devices and relationships of FIG. 3, the mapping lookup table could have the values of Table 1 herein.

TABLE 1

EXAMPLE MAPPING LOOKUP TABLE

| Company | Application | Group ID | Event | Router ID | Published Event | Subscribed Event |
|---|---|---|---|---|---|---|
| A | CONFIG | CONFIG.A | provision.load | A1 | provision.load.CONFIG.A | provision.load.CONFIG.A provision.load.A1 |
|   | CONFIG | CONFIG.A | provision.load | A2 | provision.load.CONFIG.A | provision.load.CONFIG.A provision.load.A2 |
| B | VPN | VPN.BC | provision.load | B1 | provision.load.VPN.BC | provision.load.VPN.BC provision.load.B1 |
|   |   |   | provision.load | B2 | provision.load.B2 | provision.load.B2 |
| C | VPN | VPN.BC | provision.load | C1 | provision.load.VPN.BC | provision.load.VPN.BC provision.load.C1 |
|   |   |   | provision.load | C2 | provision.load.C2 | provision.load.C2 | include any application, such as a Web server 214, a Web browser 220, a Directory service 222, etc. Web browser 220 may be located in direct communication with the Web server 214, or may communicate with the Web server through one or more networks, such as Internet 218. The Directory service 222 normally is installed on or accessible from the same machine on which the Web server 214 runs.

The format of information in the lookup table may vary from the foregoing provided that generally equivalent information is stored in the table. In one embodiment, the unique router id value is appended to the end of the name of an event to obtain a subject name that is specific to the device. Similarly, the group id value is appended to the end of the original event to derive the group event name.

Referring now to Table 1, the group event for the group "VPN.BC", with the event "provision.load", is "provision.load.VPN.BC". Similarly, the device specific event for device id "C2", with the event "provision.load", is "provision.load.C2".

In the example represented by FIG. 3 and Table 1, all routers subscribe to the "provision.load" event at startup. The "Published Event" column dictates the subject name the specific router/group will be publishing on the Event Bus 220. The "Subscribed Event" column indicates one or more subject name(s) to which a particular router will listen on the Event Bus 220. For example, router A1, acting as a publisher, will be publishing on "provision.load.CONFIG.A", and acting as a subscriber, will listen on both "provision.load.CONFIG.A", and "provision.load.A1". The "Company" and "Application" columns are provided to allow further hierarchical breakdown of the event name space.

In one embodiment, information for the lookup table is entered through a Web interface whereby an administrator or other individual connects to Data Store 212 of Namespace Mapping Service 210 using a conventional Web browser. The information is entered by persons knowledgeable in setting up networks and their respective name space(s), e.g., a network administrator.

In one specific embodiment, each entry within the "Router" column must be unique.

The following description presents three (3) examples illustrating how the table is used.

As one example, assume that an application wishes to obtain a list of subscribed subject(s) for a router C1. The application needs the unique router id (C1), and the subject to be mapped (provision.load). In response, Namespace Mapping Service 210 would provide the values "provision.load.VPN.BC", and "provision.load.C1".

As a second example, for another application to obtain the subject name that router C1 is publishing, the application supplies the router/group id (VPN.BC.), and the subject event (provision.load). In response, Namespace Mapping Service 210 provides the value "provision.load.VPN.BC".

As a third example, assume that "C1" is supplied instead of "VPN.BC" as the router/group id in the second example. In this case, the application would discover that router C1 publishes no events on its own behalf, since there is no "provision.load.C1" entry under the "Published Event" column of the above table. Thus, in response, Namespace Mapping Service provides a null list.

In this configuration, the benefit of event-based communication is provided. In particular, the Event Gateway 214 communicates with Namespace Mapping Service 210 through events carried on the Event Bus 202. This provides asynchronous communication between the gateway and the management component, and makes it distributed and extensible. Further, a standard data representation may be used. In one embodiment, Namespace Mapping Service 210 represents data in eXtensible Markup Language (XML), using the event model to communicate. This gives the components a common vocabulary, regardless of the type of application that uses the data.

Further, a Web-based approach can be provided wherein the user can access the Namespace Mapping Service through a web browser. Such a thin-client approach does not need any special requirements on the user end. In addition, the approach is location transparent, standards-based, and can be protected using conventional firewall technology. Moreover, Web browsers have become ubiquitous and are available on emerging devices such as cell phones, wireless personal digital assistants, etc.

Structure of Namespace Mapping Service

Figure 4:
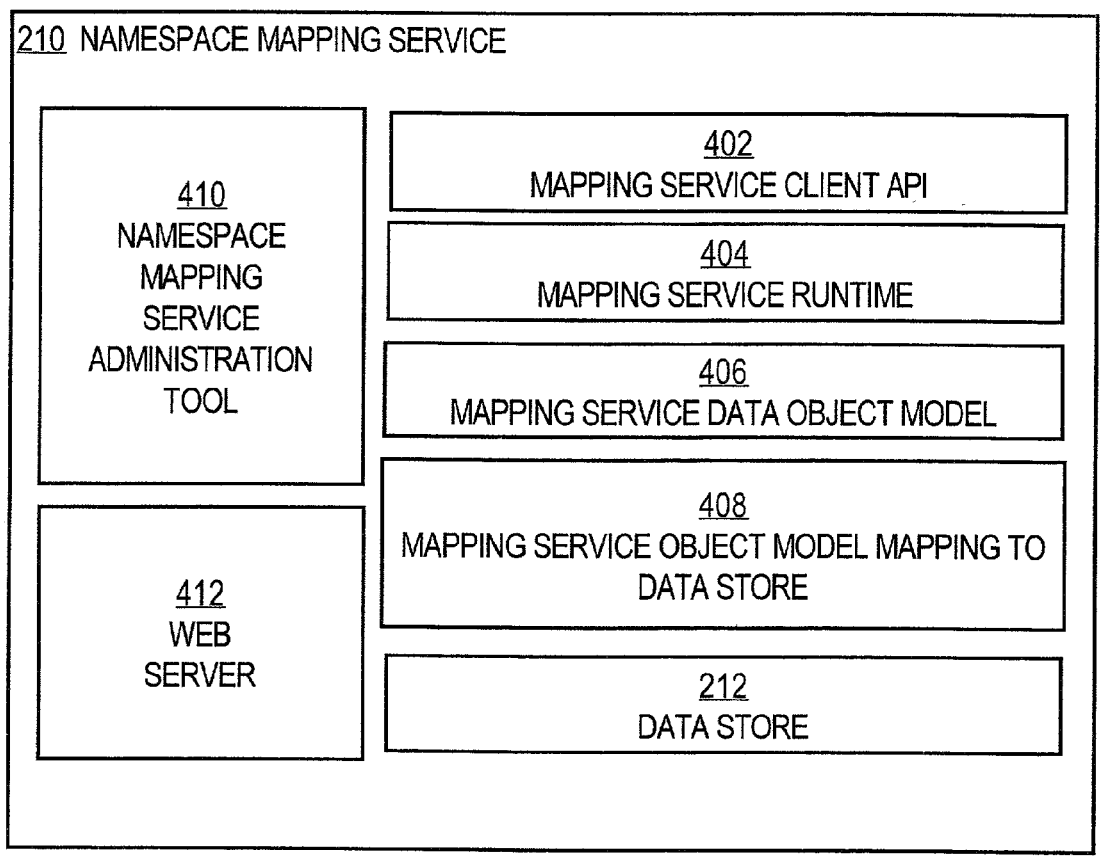
FIG. 4 is a block diagram of one embodiment of Namespace Mapping Service.

FIG. 4 is a block diagram of one embodiment of Namespace Mapping Service 210. In one embodiment, Namespace Mapping Service 210 comprises a Mapping Service Client API 402, Mapping Service Runtime 404, Mapping Service Data Object Model 406, Object Model Mapping to Data Store 408, and Data Store 212. In addition, Event Gateway 204 is made mapping-service-enabled, using the techniques described further herein.

Mapping Service Client API

Mapping Service Client API 402 comprises a set of client function calls or object methods that allow client application programs access to the Mapping Service Runtime 404. In one embodiment, API functions are "attach," "detach," "open," "close," and "resolve."

The Attach function allows the client to open a persistent connection to the Mapping Service Runtime 404. The connection is open until the client program exits. The Attach function receives one parameter, consisting of an application context. The context object determines what mechanism is at the other end of the connection from the Mapping Service Runtime 404, and specifies the communication mechanism that is used in the connection.

The Detach function tears down the connection created by the Attach call. The Detach function takes no argument and returns no value.

The Open function creates one or more non-persistent channels within the connection that is created by the Attach function call. The Open function takes one argument and returns a status code indicating operational state. The Close function terminates one or more non-persistent channels that are created by the open call. Close takes no argument and returns nothing.

The Resolve function returns to the user a set of publish/subscribe events based on specified selection criteria. Selection criteria may include device id, event subject, and action desired. In addition to returning a set of publish/subscribe events, this method will also return a status code indicating operational state.

Using conventional object-oriented programming techniques, an application program can override any of the foregoing methods in order to construct customized programs.

Mapping Service Runtime

Mapping Service Runtime 404 is an executable program component that performs the functions described in the section above entitled "Structural & Functional Overview." Functions of the Mapping Service Runtime 404 are accessed using the Namespace Mapping Service Client API 402 described herein. The Mapping Service Runtime 404 may execute on a server that is supervised and controlled by any appropriate operating system, e.g., Solaris from SunSoft, Microsoft Windows 2000, Redhat Linux, etc.

In one embodiment, in which TIB/RENDEZVOUS (event bus software) is used as Event Bus 202, Mapping Service Runtime 404 can be configured upon startup using zero or more of the following command line options. One or more of the following options may be omitted if a different software system is used for Event Bus 202.

subject: The subject name that the Namespace Mapping Service should listen on.

network: The network the Namespace Mapping Service should run on.

service: The service group the Namespace Mapping Service should run in.

daemon: The remote Rendezvous daemon that the Namespace Mapping Service should contact.

file: The file repository the Namespace Mapping Service should contact.

directory: The directory the Namespace Mapping Service should contact.

Mapping Service Enabled Event Gateway

Event Gateway 204 is configured to interoperate with Namespace Mapping Service 210. In such a configuration, Event Gateway 204 performs the following functions:

1. Receive unique device id from connecting network device(s). When a router initiates connection to the Event Gateway 204, as part of control message it sends its device id, which is used as identifier for the router.

2. Subscription request handling from router. When Event Gateway 204 receives a subscription request from a router, it contacts the Namespace Mapping Service 210 to obtain a list of subscriptions specific to the current application configuration. Event Gateway 204 then subscribes to those events on behalf of the requesting router. Further description of this process is provided herein with reference to FIG. 7.

3. Publish request handling from router. When Event Gateway 204 receives a publish request from a router, it contacts the Namespace Mapping Service 210 to obtain a list of events to publish to, which is specific to the current application configuration. Event Gateway 204 then publishes on those events on behalf of the router. Further description of this process is provided herein with reference to FIG. 8.

4. Perform reverse lookups between mapped events and original device event. When an event is published on the mapped subject, the event is sent to the device on the original subject.

5. Build a local copy of a cache to lookup event mappings already returned by Namespace Mapping Service 210. Local copies of a first cache of subscribe event mappings and a second cache of publish event mappings are created and stored when Event Gateway 204 receives replies from Namespace Mapping Service 210. Before Event Gateway 204 sends requests to Namespace Mapping Service 210, the Event Gateway looks up the requests in the caches to determine whether a mapping can be obtained from the cache.

In one embodiment, the Event Gateway 204 has a configurable cache size and cache timeout.

If the Namespace Mapping Service 210 is not available when Event Gateway 204 issues a request, then the Event Gateway 204 will time out. If the cache is not available or a mapping cannot be found, then the Event Gateway 204 will subscribe or publish on the cached subject or the unmapped subject name, appended with the device id value.

Namespace Mapping Service Administration Tool; Web Server

Namespace Mapping Service Administration Tool 410 is one or more programs that provide administrative functions as further described herein. In one embodiment, the administrative tool may be web-based.

Mapping Service Data Object Model

Figure 5:
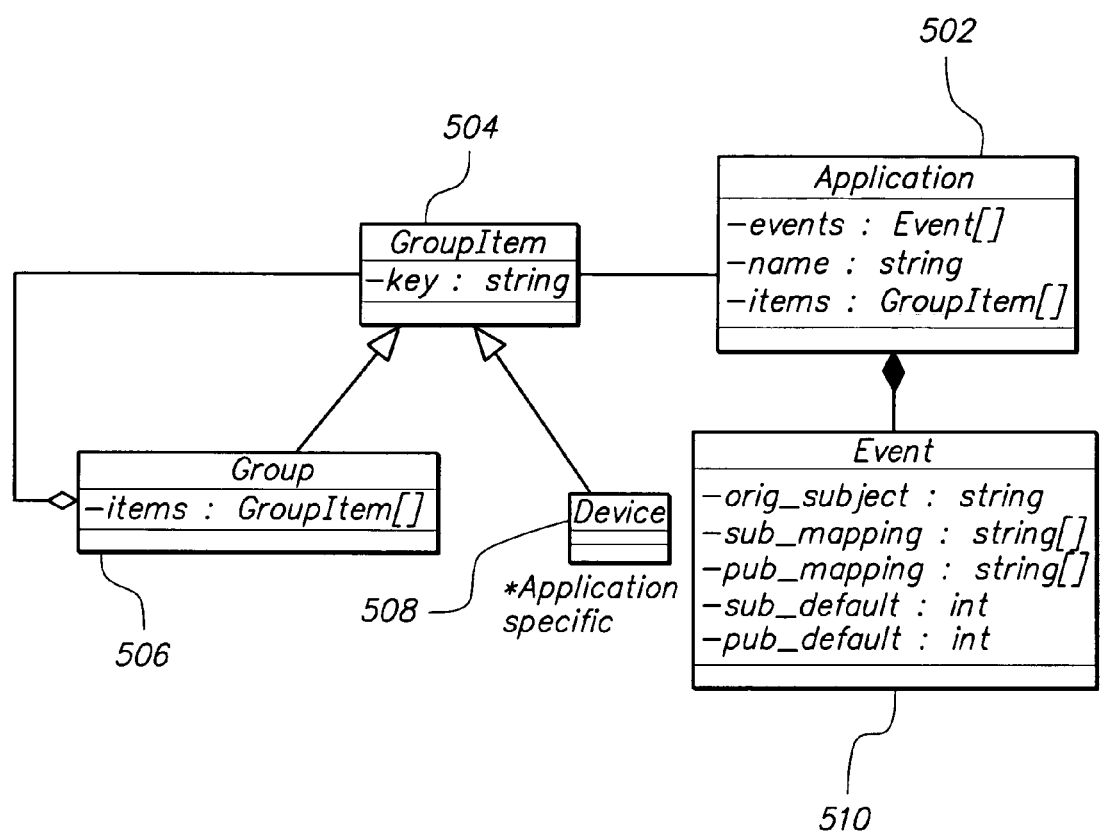
FIG. 5 is a block diagram of a data object model that may be used in an embodiment.

FIG. 5 is a block diagram of a data object model that may be used in an embodiment, and shows logical associations between applications, devices, groups, and events. The elements of FIG. 5 may be created as persistent objects in the Data Store 212 of Namespace Mapping Service 210. Generally, the object model includes objects based on an Application class 502, Group Item class 504, Group class 506, Device class 508, and Event class 510. Group class 506 and Device class 508 inherit from Group Item class 504. Hence, an object that is instantiated from Group Item class 504 can be either a Group or a Device. A Group is an aggregation of Group Item objects; so a Group can consist of devices or other groups. The same device can also be part of multiple groups.

A set of events is controlled by an application. This relationship is modeled as a composition, in which an object that is instantiated from Application class 502 is composed of one or more events that are instantiated from Event class 510. One event cannot be part of more than one application. An example of an event is "cisco.cns.config.load," which is an event controlled by the Configuration Service.

Groups are created for use by applications. One group may be used by many applications. Accordingly, the relationship between the Group Item class 504 and Application class 502 is a many-many association. As an example, a network device provisioning application can create logical groups for its use. Assume that the groups are created with a value of the geographic location of devices as the criteria. Thereafter, the groups may be used for other applications that need to group devices by geographic location.

Each Group Item object represents a Group entity, such as a group or a device. With each Group Item object, a Key value is a string that uniquely identifies the entity in a namespace.

Each Group object represents a group of devices or other groups. Within each Group object, an Items value holds a set of entities, such as devices or groups, of which the group consists.

Each Device object is a group entity and represents an application specific device object. Applications create Device objects based on any class definition, provided that the class includes an attribute called "key", which holds a value that uniquely identifies the device in the application's namespace.

Each Event object represents an event whose subject needs to be mapped. In an Event object, an Original Subject ("Orig_subject") attribute holds a value indicating a subject to be mapped. A Subscriber Mapping ("Sub_mapping") attribute holds a mapping list for a subscriber. A Publisher Mapping ("Pub_mapping") attribute holds a mapping list for a publisher.

A Subscriber Default ("Sub_default") flag stores a value that indicates how to derive a mapping list for a subscriber. In one embodiment, if the Subscriber Default value is 1, then the Event Mapping Service 210 generates a mapping algorithmically. If the Subscriber Default attribute has any other value, then the Subscriber Mapping attribute gives the complete mapping list for a subscriber. Similarly, a Publisher Default ("Pub_default") flag stores a value that indicates how to derive a mapping list for a publisher. In one embodiment, if the Publisher Default value is 1, then the Event Mapping Service determines the mapping algorithmically. Otherwise, the Publisher Mapping value has the complete mapping list for a publisher.

Each Application object represents an application. In one embodiment, the Application class 502 includes an Events attribute that represents one or more events that are controlled by this application (published/subscribed to). A Name attribute represents a name of the application. An Items attribute represents groups created for the application or the devices on which the application runs, and gives the entities with which the application is associated. This object model can be changed, and this object model or an alternative object model can be used dynamically.

Object Model Mapping to Data Store

The object model described above is mapped to an external data store during the installation process. For example, in the system of FIG. 1B, when Namespace Mapping Service 210 is installed, a mapping from the object model to the data representation of the Directory 222 is created and stored. This may be in the form of schema extensions in the case of a directory, tables for databases, etc.

Miscellaneous

In one embodiment, Namespace Mapping Service 210 enables either static or dynamic reconfiguration of target devices.

Also in one embodiment, Namespace Mapping Service 210 is installed within a secure network such that no encryption of data on the event bus is provided. In addition, in one embodiment, no user authorization is required to modify the lookup table. Of course, with additional program components, security functionality can be provided.

In this configuration, the Namespace Mapping Service 210 is highly scalable, and can operate with as many devices, groups, applications, and events as desired provided that the machine that runs the Namespace Mapping Service has sufficient memory and CPU resources.

Interaction of Namespace Mapping Service Components

Figure 7:
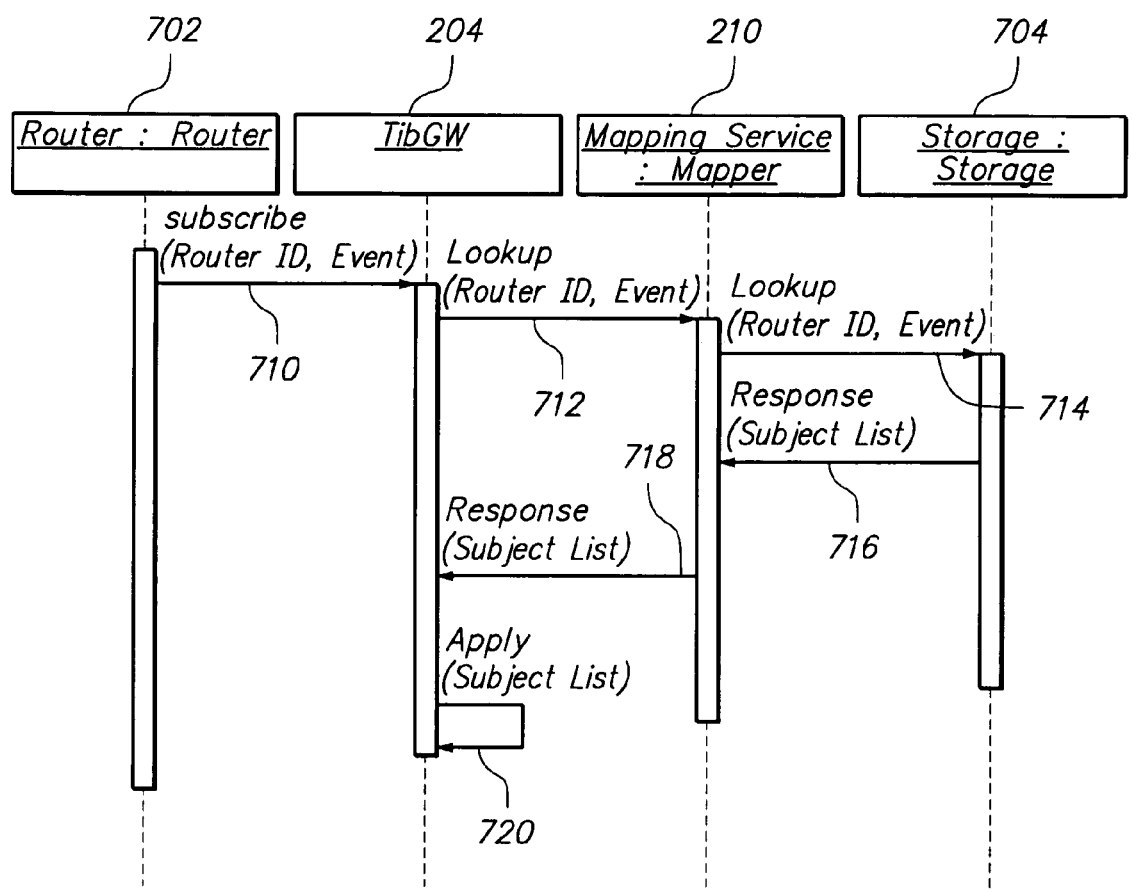
FIG. 7 is a sequence diagram that illustrates operation of Namespace Mapping Service for a subscribe process.

FIG. 7 is a sequence diagram that illustrates operation of Namespace Mapping Service 210 in connection with other components. For purposes of illustrating an example, FIG. 7 depicts a typical router startup scenario, and assumes that a mapping lookup table of the type shown herein as Table 1 has been created and stored. The actions shown in FIG. 7 involve a router 702, which is an example of a network device 206A, 206B, 206C of FIG. 1B; Event Gateway 204; Namespace Mapping Service 210; and Storage 704. Storage 704 is any volatile or non-volatile storage that can hold the mapping lookup table.

When router 702 starts up, it sends a subscription event to the Event Gateway 204, as indicated by path 710. Event Gateway 204 then contacts the Namespace Mapping Service 210, as indicated by path 712. Namespace Mapping Service 210 performs a lookup using the lookup table, as shown by path 714. A subscription list, which is the result of the lookup, is passed back to Event Gateway 204, as shown by path 716 and path 718. At this point, the Event Gateway 204 applies the subscription list, if any, on behalf of the initiating router, as shown by path 720.

In this arrangement, Event Gateway 204 acts as a proxy for a client application that needs mapping services. In another embodiment, the client application communicates directly with Namespace Mapping Service 210, without using a gateway or other intermediary. The application may directly call functions of an API of the Namespace Mapping Service 210, e.g., Attach, Detach, Open, Close, Resolve, etc., to carry out resolution of mappings. Use of a gateway is efficient in cases in which legacy applications are required to access Namespace Mapping Service 210 such that modification of the existing applications is undesirable.

From this point on, Event Gateway 204 will send event information to the initiating router 702 when any events that are part of the subscription list of path 716, 718 are put on the Event Bus 202. Since the initiating router 702 does not hold the subscription list, the Event Gateway pushes events to it using the name of the original subscription event.

Figure 8:
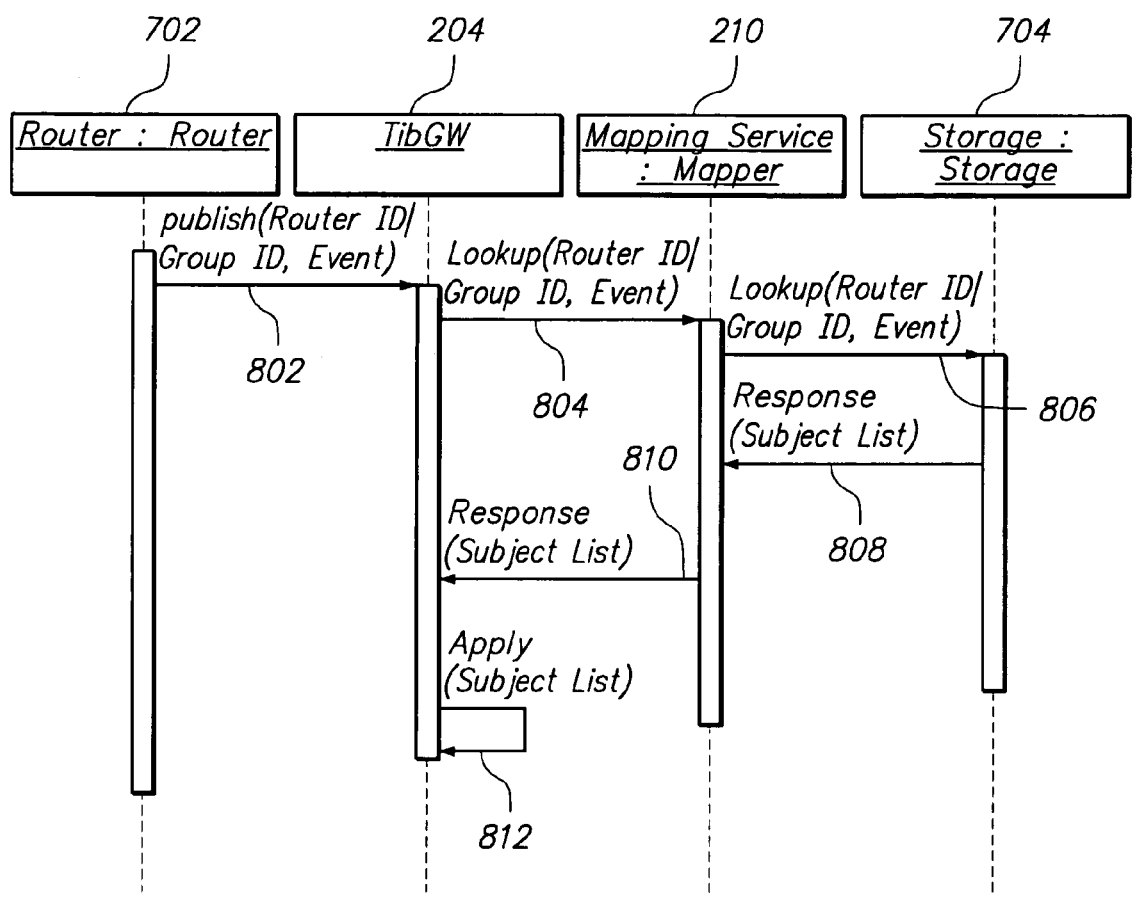
FIG. 8 is a sequence diagram that illustrates a similar process flow for a publish process.

FIG. 8 is a sequence diagram that illustrates a similar process flow for a publish process. The publishing sequence flow is very similar to that of the subscription flow. Referring now to FIG. 8, router 702 sends a publish event to Event Gateway 204, as indicated by path 802. Event Gateway 204 then contacts the Namespace Mapping Service 210 and requests a publish lookup, as indicated by path 804. Namespace Mapping Service 210 performs a lookup using the lookup table, as shown by path 806. A publish subject list, consisting of zero or more events, and which is the result of the lookup, is passed back to Event Gateway 204, as shown by path 808, 810. At this point, the Event Gateway 204 applies the publish list, if any, on behalf of the initiating router, as shown by path 812.

Hardware Overview

Figure 6:
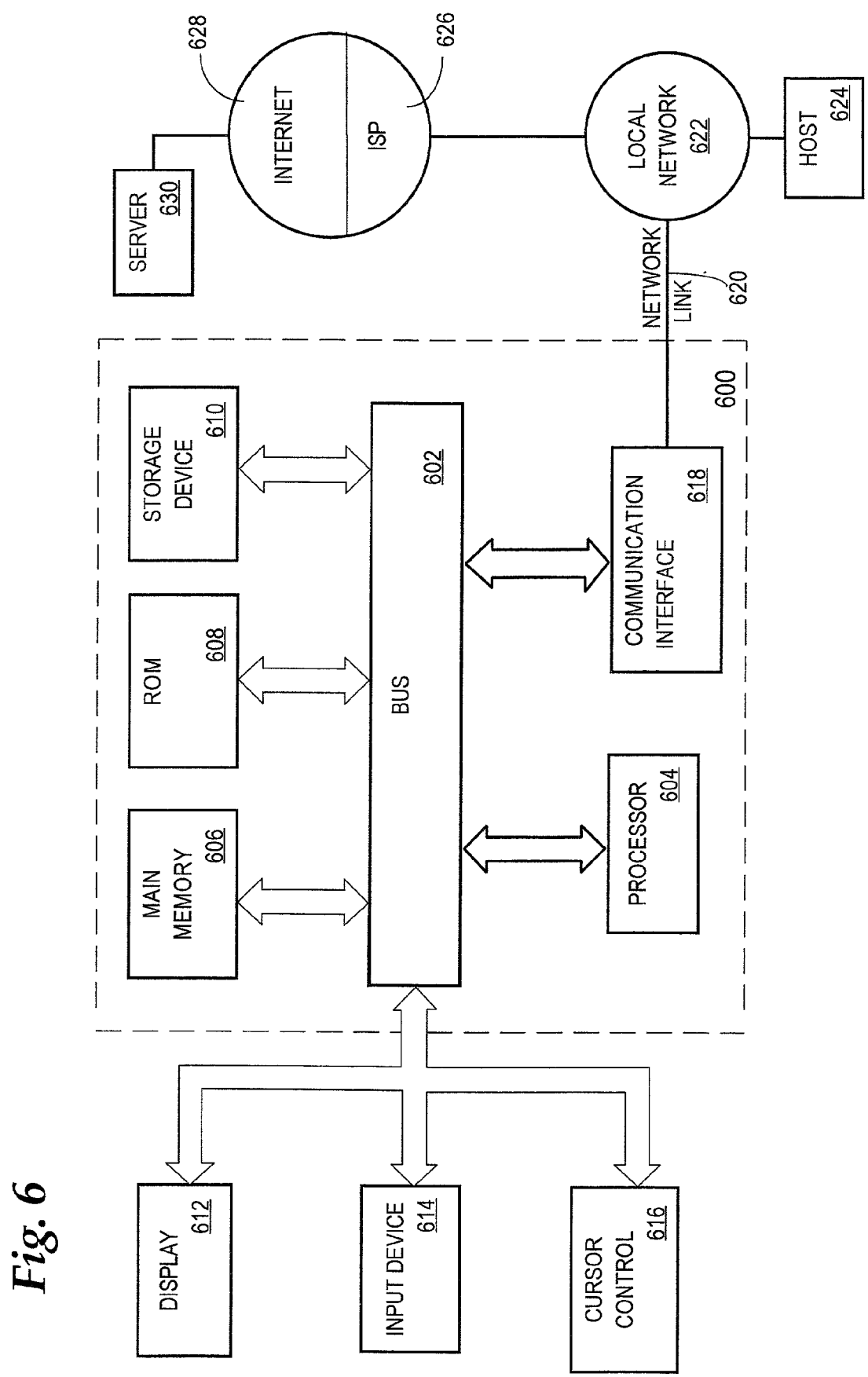
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for mapping network events to names of network devices. According to one embodiment of the invention, mapping network events to names of network devices is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for mapping network events to names of network devices as described herein.

Processor 604 may execute the received code as it is received, and/or stored in storage device 610, or other non-volatile storage for later execution. In this manner, computer system 600 may obtain application code in the form of a carrier wave.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An event gateway apparatus, comprising:
a network interface that is communicatively coupled to a network comprising a logical group having two or more packet data routers as members;
an event bus interface that is communicatively coupled to a software event bus configured to receive event subscribe requests comprising subject identifiers, to logically subscribe a specified network device to events having a matching subject identifier, and to logically publish events having the matching subject identifier to the specified network device;
a data store comprising a stored mapping that associates a plurality of routers with the logical group and that associates the logical group with one or more events that can pass over the event bus to the router;
automatic event subscription logic encoded in one or more media for execution and when executed operable to:
receive an event subscribe request from the router that includes a router identifier that uniquely identifies the router and an event identifier;
in response to receiving the event subscribe request: locating the router identifier and the event identifier in the mapping; identifying the logical group of which the router is a member; based on the logical group, router identifier and event identifier, identifying an event subject list that identifies all subjects that are available using the event bus and to which the router should subscribe; and sending one or more event subscribe requests to the event bus that request the event bus to subscribe the router to all events in the event subject list.

2. The apparatus of claim 1 wherein the automatic event subscription logic when executed is operable to receive application-specific mapping information from an application program and updating the mapping using the application-specific mapping information.

3. The apparatus of claim 2 wherein the automatic event subscription logic when executed is operable to receive application-specific mapping information from an application program in XML format using a data access component that transforms the application-specific mapping information from XML format into a canonical object model format.

4. The apparatus of claim 2 wherein the mapping comprises an association of stored values that identify for each of the routers, an application, a group identifier, an event of the one or more events, a network device identifier, one or more published events, and one or more subscribed events.

5. The apparatus of claim 2 wherein the automatic event subscription logic when executed is operable to receive a publish request that includes a router identifier for one of the routers in the logical group or a group identifier of the logical group, and the event identifier.

6. A computer-readable storage medium encoded with logic for automatically subscribing a router of a packet-switched network to a plurality of events applicable to a logical group of which the router is a member, which when executed is operable to:

interface to a network comprising a logical group having two or more packet data routers as members;

interface to a software event bus configured to receive event subscribe requests comprising subject identifiers, to logically subscribe a specified network device to events having a matching subject identifier, and to logically publish events having the matching subject identifier to the specified network device;

create and store a mapping that associates a plurality of routers with the logical group and that associates the logical group with one or more events that can pass over the event bus to the router;

receive an event subscribe request from the router that includes a router identifier that uniquely identifies the router and an event identifier;

in response to receiving the event subscribe request: locating the router identifier and the event identifier in the mapping; identifying the logical group of which the router is a member; based on the logical group, router identifier and event identifier, identifying an event subject list that identifies all subjects that are available using the event bus and to which the router should subscribe; and sending one or more event subscribe requests to the event bus that request the event bus to subscribe the router to all events in the event subject list.

7. An apparatus for automatically subscribing a router of a packet-switched network to a plurality of events applicable to a logical group of which the router is a member, comprising:

means for interfacing to a network comprising a logical group having two or more packet data routers as members;

means for interfacing to a software event bus configured to receive event subscribe requests comprising subject identifiers, to logically subscribe a specified network device to events having a matching subject identifier, and to logically publish events having the matching subject identifier to the specified network device;

means for storing a mapping that associates a plurality of routers with the logical group and that associates the logical group with one or more events that can pass over the event bus to the router;

means for receiving an event subscribe request from the router that includes a router identifier that uniquely identifies the router and an event identifier;

means for performing, in response to receiving the event subscribe request: locating the router identifier and the event identifier in the mapping; identifying the logical group of which the router is a member; based on the logical group, router identifier and event identifier, identifying an event subject list that identifies all subjects that are available using the event bus and to which the router should subscribe; and sending one or more event subscribe requests to the event bus that request the event bus to subscribe the router to all events in the event subject list.

8. The apparatus of claim 7 wherein the automatic event subscription logic when executed is operable to receive application-specific mapping information from an application program and updating the mapping using the application-specific mapping information.

9. The apparatus of claim 7 wherein the automatic event subscription logic when executed is operable to receive application-specific mapping information from an application program in XML format using a data access component that transforms the application-specific mapping information from XML format into a canonical object model format.

10. The apparatus of claim 7 wherein the mapping comprises an association of stored values that identify for each of the routers, an application, a group identifier, an event of the one or more events, a network device identifier, one or more published events, and one or more subscribed events.

11. The apparatus of claim 7 wherein the automatic event subscription logic when executed is operable to receive a publish request that includes a router identifier for one of the routers in the logical group or a group identifier of the logical group, and the event identifier.

* * * * *